Jan. 18, 1966 G. P. NIESEN ETAL 3,229,908

PRESETTABLE AUTOMATIC RESETTING COUNTER FOR DUPLICATING MACHINES

Filed April 1, 1964 3 Sheets-Sheet 1

George P. Niesen
Raoul L. Gott
Wallace R. Fowlie
INVENTORS

By McDougall, Hersh and Scott
Attys

George P. Niesen
Raoul L. Gott
Wallace R. Fowlie
INVENTORS
By McDougall, Hersh and Scott
Att'ys George P. Niesen
Raoul L. Gott
Wallace R. Fowlie
INVENTORS
By McDougall, Hersh
and Scott
Attys United States Patent Office 3,229,908 Patented Jan. 18, 1966

3,229,908

PRESETTABLE AUTOMATIC RESETTING COUNTER FOR DUPLICATING MACHINES

George P. Niesen, Niles, Raoul L. Gott, River Grove, and Wallace R. Fowlie, North Riverside, Ill., assignors to A. B. Dick Company, Niles, Ill., a corporation of Illinois Filed Apr. 1, 1964, Ser. No. 356,534
6 Claims. (Cl. 235—132)

This invention relates to duplicating and printing machine or similar equipment, and pertains particularly to a new and improved counter for counting the number of sheets printed by such machines.

One object of the present invention is to provide a new and improved counter which may be preset so as to count to any desired number, and which is effective to shut off the feed mechanism or perform some other function when the preset count is reached.

A further object is to provide such a new and improved counter which automatically resets itself to its original preset condition, upon the completion of the preset count, so that the counter will be ready to count again to the preset number, without any further manual setting or manipulation of the counter.

Another object is to provide such a new and improved counter which is made as a unit so that it may readily be employed on virtually any duplicating or printing machine of appropriate design.

A further object is to provide such a counter which is positive and reliable in operation, yet is extremely economical.

Further objects and advantages of the present invention will appear from the following description taken with the accompanying drawings, in which.

Figure 1:
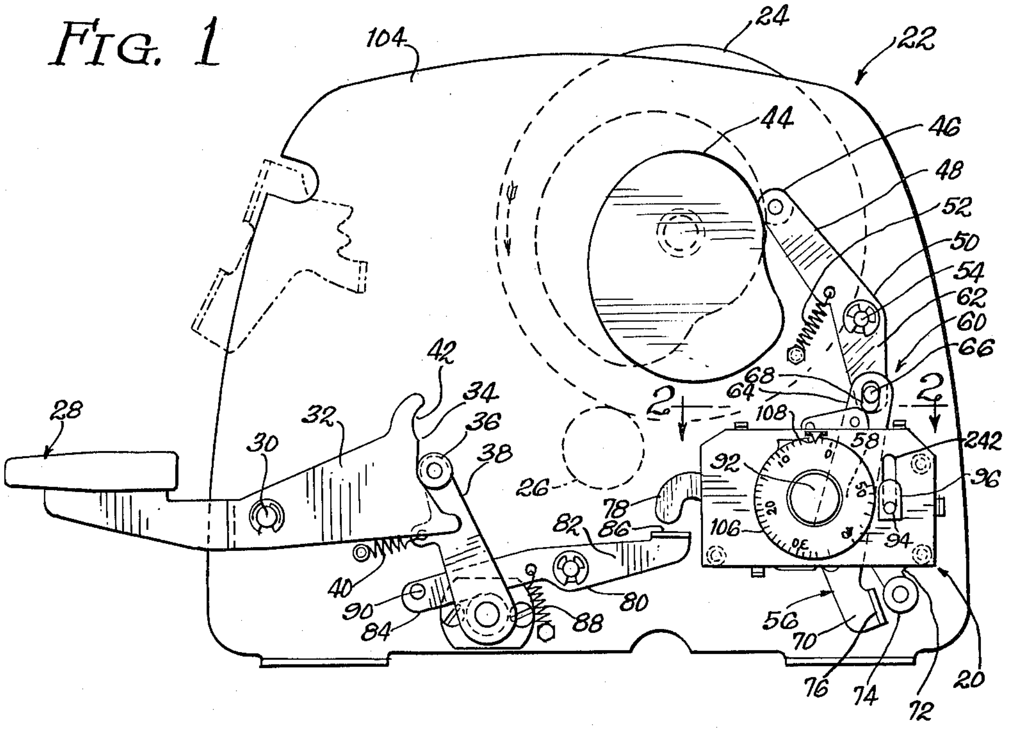
FIG. 1 is a somewhat diagrammatic elevational view of a duplicating machine equipped with a counter to be described as an illustrative embodiment of the present invention.

As already indicated, FIG. 1 illustrates a counter unit 20 as employed in connection with a duplicating machine 22. The illustrated machine 22 is of the dye transfer type in which moistened sheets of paper are fed between a master cylinder 24 and an impression roller 26. The master cylinder 24 carries a master sheet which is provided with a reverse image of the material to be duplicated. The image is formed in a dye or ink which is adapted to be transferred to the moistened sheets of paper. The liquid employed to moisten the sheets dissolves some of the dye from the image on the master sheet, and may also have the effect of developing or intensifying the dye.

It will be understood, however, that the counter of the present invention may be employed in connection with any desired type of duplicating or printing machine. Thus, for example, the counter may be used in connection with stencil duplicators or offset duplicators using the lithographic process.

The counter 20 serves the basic purpose of shutting off the operation of the duplicating machine 22 when a preselected count is reached in the printing of copy sheets. The illustrated machine 22 has a hand lever 28 which may be operated to start and stop the feed mechanism of the machine. It will be understood that the feed mechanism is adapted to feed the copy sheets one at a time between the cylinder 24 and the roller 26. Such automatic feed mechanisms are well known to those skilled in the art so that it will not be necessary to describe any specific mechanism. In FIG. 1, the hand lever 28 is in its central or neutral position, in which the operation of the feed mechanism is stopped. To start the operation of the feed mechanism for an extended sequence of operation, the lever 28 is swung upwardly about its supporting pivot 30. It will be seen that the lever 28 has an oppositely extending arm 32 which is moved downwardly when the lever 28 is swung upwardly. The arm 32 is provided with a cam 34 which is engaged by a follower roller 36 on an arm 38. When the arm 32 is swung downwardly, the arm 38 is moved to the right or clockwise by the cam 34. Such movement of the arm 38 is effective to start the operation of the feed mechanism. The arm 38 is moved against the biasing force of a return spring 40. At its upper end, the cam 34 has a detent notch 42 which is entered by the roller 36 when the arm 32 is moved downwardly to its limit of travel. The cooperation between the roller 36 and the detent notch 42 holds the arm 32 in its downwardly displaced position so that the operation of the feed mechanism is maintained. It will be understood that the specific arrangement of the control lever 28 may be varied by those skilled in the art and that the illustrated construction is being described merely to explain one particular application of the counter.

The illustrated duplicating machine 22 has a cam 44 which is adapted to rotate with the main cylinder 24 whenever copy sheets are being fed to the cylinder. The cam 44 may be employed to perform various functions, and in this instance it is employed to operate the counter 20. Thus, the cam 44 is engaged by a follower roller 46 mounted on the upper arm 48 of a lever 50. A spring 52 is employed to bias the lever 50 in a counterclockwise direction so that the roller 46 will be pressed against the cam 44. The lever 50 is swingable about a pivot 54.

In this case, the lever 50 is adapted to operate a second lever 56 which is swingable about a pivot 58. A pin and slot connection 60 is employed between the lower arm 62 of the lever 50 and the upper arm 64 of the lever 56. As shown, the arm 62 is provided with a pin 66 which is slidably received in a longitudinal slot 68 formed in the arm 64. The lever 56 has a lower arm 70 adapted to operate the counter 20. It will be understood that the arm 70 oscillates back and forth, from left to right, as the cam 44 is rotated. Each revolution of the cam 44 corresponds to the feeding of one copy sheet. Thus, the arm 70 is oscillated back and forth through one complete cycle for each copy sheet which is fed to the machine.

The illustrated counter 20 is provided with a power lever 72 adapted to receive operating power from the arm 70. The lever 72 carries a roller 74 which is engaged by an ear or flange 76 on the arm 70. In each cycle of the arm 70, the power lever 72 is pushed to the right or counterclockwise.

The counter 20 also has an output or shutoff lever 78 which remains stationary until the preselected count is reached, whereupon the lever 78 is swung downwardly or counterclockwise by the mechanism embodied in the counter. The downward movement of the output lever 78 is employed to shut off the feed mechanism of the machine. As shown, this is accomplished by providing a lever 80 having right and left arms 82 and 84. The right arm 82 carries a flange or ear 86 which is adapted to be engaged and moved downwardly by the output lever 78. The lever 80 is thus moved clockwise, against the biasing force of a return spring 88. As shown, the left arm 84 carries a pin 90 which is adapted to engage the lower edge of the arm 32 so that the arm 32 will be swung upwardly to its neutral position when the lever 80 is swung clockwise by the output lever 78. The return of the arm 32 to its neutral position stops the feeding mechanism of the machine and also stops the rotation of the cam 44, so that there is no further actuation of the counter until the hand lever 28 is again swung upwardly to start the operation of the feed mechanism.

The illustrated counter 20 has two manually operable controls, including a presetting knob 92, which is adapted to be rotated to preselect the desired count, and a resetting knob 94 mounted on a slide 96 which may be moved upwardly and downwardly to control the operation of the counter. In FIG. 1, the knob 94 is in its downwardly displaced or operating position, in which the counter performs its normal counting operation. The knob 94 may be moved upwardly to its resetting position, in which the counter is shut off and is reset to a count of zero.

The present counter 20 is unitized so that it is well adapted for use as a unit on various duplicating and printing machines. Thus, the illustrated counter comprises front and rear frame plates 98 and 100, between which a plurality of posts or pillars 102 are rigidly mounted. In this case, the duplicating machine 22 has a frame plate 104 to which the rear plate 100 is secured.

The preselector knob 92 is provided with a dial 106 to show the count which has been selected by rotating the knob. A stationary pointer 108 is provided adjacent the dial. The knob 92 is normally locked against rotation, but it may be released by pushing rearwardly on the knob, whereupon it may be rotated to the desired position. In this case, the dial 106 is graduated from zero to 50, so that 50 represents the maximum count which can be preselected. It will be understood, however, that the design may be modified to change the maximum count as desired.

The device for normally locking the knob 92 comprises a toothed wheel or disc 110 which is rotatable with the knob 92 and is adapted to engage a pointed stop or detent 112. The disc 110 has teeth 114 which are generally V-shaped, and the detent 112 is similarly shaped for reception between any pair of adjacent teeth. The pointed detent 112 is formed on a plate 116 which is secured to the front frame plate 98. Normally, the toothed disc 110 is disposed immediately behind the front plate 98 so that the teeth 114 interlock with the detent 112. The rearward movement of the knob 92 moves the toothed disc 110 out of engagement with the detent 112 so that the knob 92 may be rotated. A spring 118 is provided to bias the disc 110 in a forward direction so that it will return forwardly into engagement with the detent 112 when the knob 92 is released.

Figures 4, 5:
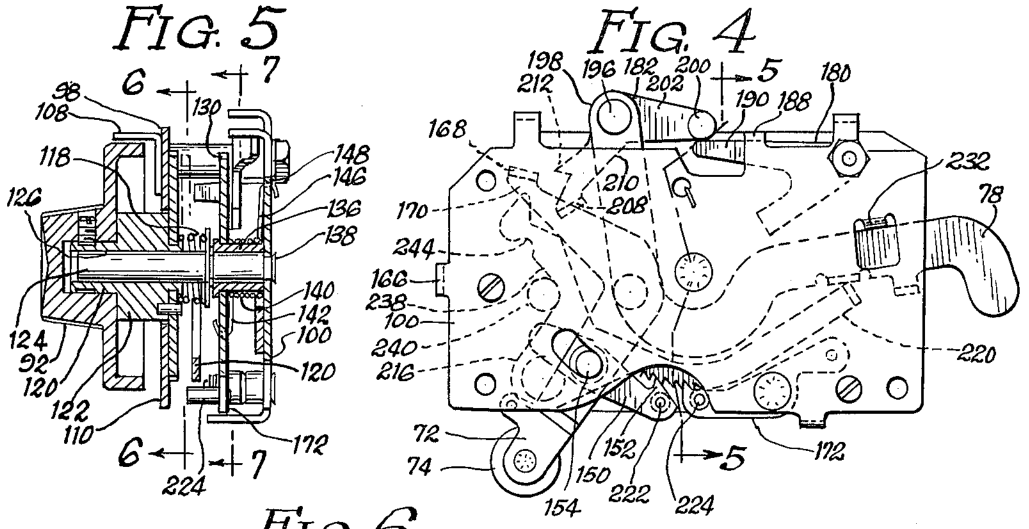
FIG. 4 is a rear view of the counter unit.
FIG. 5 is a cross-section taken generally as indicated by the broken line 5—5 in FIG. 4.
Figure 6:
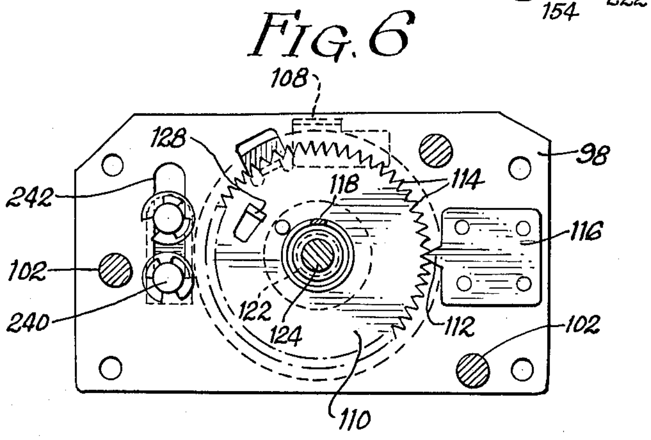
FIG. 6 is a vertical section taken along the line 6—6 in FIG. 5.
Figure 7:
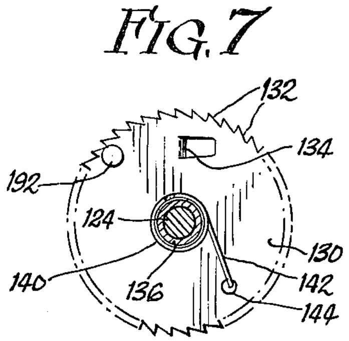
FIG. 7 is a fragmentary vertical section with parts removed to show the ratchet wheel of the counter, the view being taken generally along the line 7—7 in FIG. 5.
Figure 8:
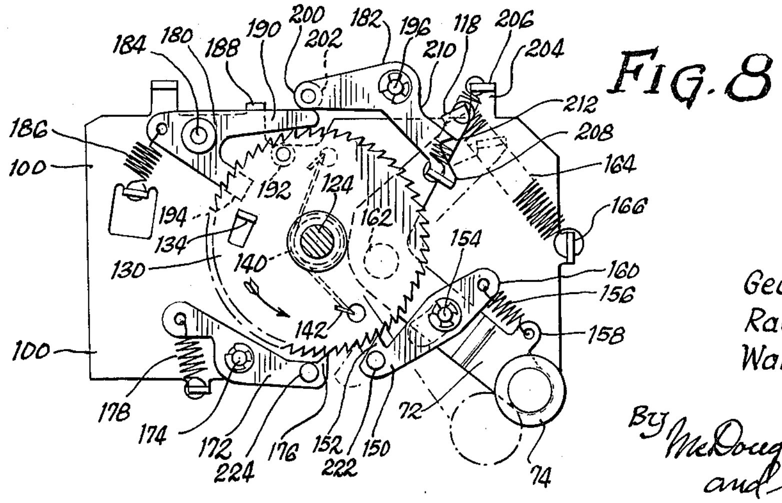
FIG. 8 is a view similar to FIG. 3 but showing changes in the positions of the various parts when the counter is actuated to register a count of one unit.

As shown to advantage in FIG. 5, the knob 92 is secured to the reduced front end portion 120 of a hub or bushing 122. The toothed disc 110 is secured to the rear portion of the hub 122. To provide for the rotation and rearward movement of the knob, the hub 122 is rotatable and slidably mounted on a stationary shaft or pin 124. Thus, a bore 126 is formed in the hub 122 to receive the shaft 124. It will be seen that the spring 118 is in the form of a compression coil spring disposed around the shaft 124.

The rotation of the knob 92 has the effect of changing the position of a stop 128. The position of the stop 128 determines the count to which the counter will be operated. As shown, the stop 128 is in the form of an ear or flange which is struck rearwardly out of the toothed disc 100.

The operation of the power lever 72 advances a ratchet or counter wheel 130 having the usual ramp-type ratchet teeth 132. The ratchet wheel 130 is provided with a member 134 which is adapted to engage the adjustable stop 128 to determine the strating position of the ratchet wheel 130 for any counting sequence. As shown, the member 134 takes the form of an ear or flange which is struck forwardly from the ratchet wheel 130. It will be seen fıom FIG. 5 that the ratchet wheel 130 is mounted on a hub or bushing 136 which is rotatably received on the rear portion of the stationary shaft 124. At its extreme rear end, the shaft 124 has a portion 138 which is riveted into or otherwise secured to the rear frame plate 100. The hub 136 is disposed immediately in front of the rear plate 100. However, the ratchet wheel 130 is mounted on the front portion of the hub 136.

Figures 2, 3:
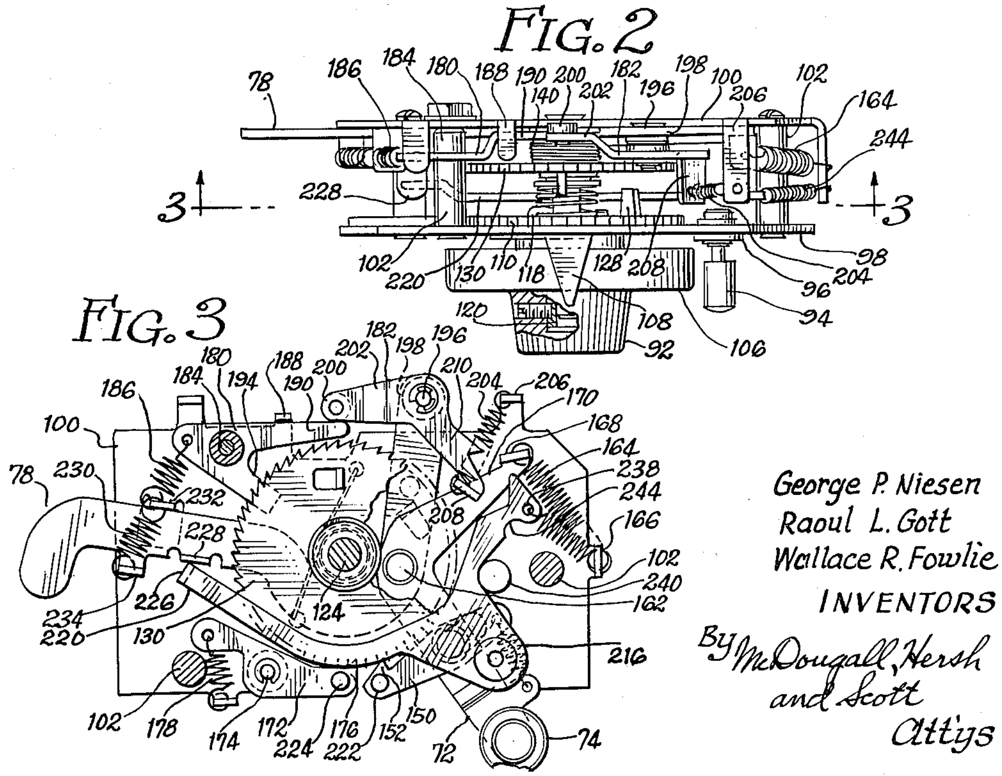
FIG. 2 is a plan view of the counter unit as employed in the duplicating machine of FIG. 1.
FIG. 3 is a vertical section taken generally along the line 3—3 in FIG. 2.

The ratchet wheel 130 is biased by a return spring 140 which tends to rotate the ratchet wheel in a clockwise direction as viewed from the front (FIG. 3). The spring 140 may be in the form of a coiled torsion spring mounted around the hub 136 to the rear of the ratchet wheel 130. The spring 140 has an arm 142 at its front end which is hooked into a hole 144 in the ratchet wheel 130. At its rear end, the spring 140 has an arm 146 which is hooked into an opening 148 in the rear frame plate 100. It will be understood that the adjustable stop 128 arrests return rotation of the ratchet wheel 130 and determines the position to which the ratchet wheel is returned by the spring 140.

The oscillations of the power lever 72 are utilized to advance the ratchet wheel 130. To this end, a ratchet pawl 150 is connected to the lever 72. The pawl 150 has a tooth 152 which is engageable with the ratchet teeth 132. It will be seen that the pawl 150 is mounted on a pin or pivot 154 which is carried by the lever 72. A spring 156 is provided to bias the pawl 150 against the ratchet wheel 130. As shown, the spring is connected between an ear 158 formed on the lever 72 and an arm 160 on the pawl 150.

The power lever 72 is swingable about a pivot 162 which is mounted on the rear plate 100. A return spring 164 is provided to bias the lever 72 in a clockwise direction as viewed from the front (FIG. 3). The spring 164 is connected between a stationary anchoring ear 166 on the rear plate 100 and an ear 168 which is formed on an arm 170 of the lever 72. In this case, each actuating movement of the lever 72 advances the ratchet wheel 130 through an angle corresponding to the pitch of the teeth 132.

During the normal counting operation, retrograde or reverse movement of the ratchet wheel 130 is prevented by a non-retrograde pawl 172 which is swingable about a pivot 174 on the rear frame plate 100. The pawl 172 has a point 176 which is engageable with the ratchet teeth 132. A spring 178 is connected to the pawl 172 to bias it against the ratchet wheel 130.

The ratchet wheel 130 is advanced in a repetitive fashion until the next to the last count is registered, whereupon a mechanism is operated so as to establish a driving connection between the power lever 72 and the output lever 78, so that the final movement of the power lever will also be effective to move the output lever. The mechanism whereby these operations are brought about comprises a relay or intermediate lever 180 and a connecting pawl 182. The relay intermediate lever 180 is swingable about a pivot 184 on the rear plate 100. A spring 186 is connected to the lever 180 to provide a biasing force which tends to swing the lever in a counterclockwise direction. Such counterclockwise movement is limited by an ear or stop 188 on the rear plate 100. The lever 180 has a horizontal arm 190 which is adapted to engage the ear 188.

When the next to the last count is registered on the counter, the lever 180 is caused to move in a clockwise direction by a pin 192 on the ratchet wheel 130. The pin 192 engages a downwardly angling arm 194 on the lever 180. Such operation of the lever 180 is shown to best advantage in FIG. 9, which represents the actuated position of the counter as the next to the last count is registered.

The pawl 182 is adapted to form the driving connection between the power lever 72 and the output lever 78. It will be seen that the pawl 182 is swingable about a pivot 196 which is carried by an upwardly projecting arm 198 of the output lever 78. From FIG. 3, it will be apparent that the output lever 78 is swingable about the same pivot 162 which supports the power lever 72.

When the intermediate lever 180 is in its normal or initial position, as shown in FIG. 3, it holds the pawl 182 in an inactive position. Thus, the horizontal arm 190 of the relay lever 180 is engaged by a roller or pin 200 on one arm 202 of the pawl 182. The pawl 182 is biased to this position by a spring 204 which tends to swing the pawl counterclockwise. It will be seen that the spring is connected between a fixed anchoring ear 206 on the rear plate 100 and an ear 208 on the second arm 210 of the pawl 182.

Figure 9:
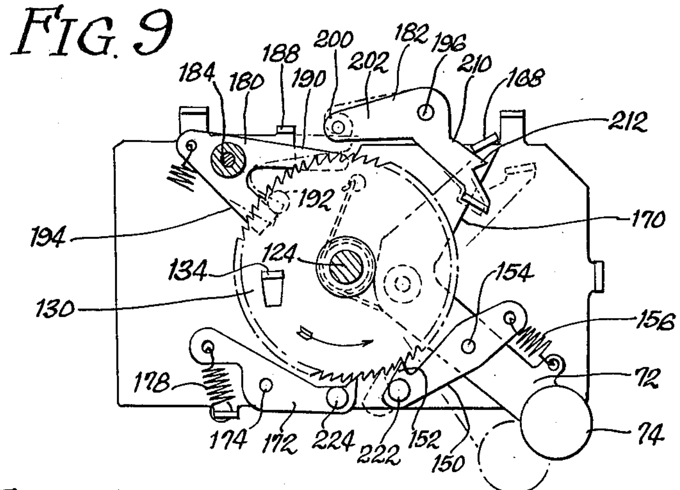
FIG. 9 is a view similar to FIG. 3 but showing the changed positions of various parts when the counter is actuated for the next to the last count.

It will be recalled that the intermediate lever 180 is swung clockwise on the next to the last count. Such movement of the lever 180 moves the horizontal arm 190 away from the pin 200, whereupon the spring 204 causes the pawl 182 to swing counterclockwise until it engages the ear 168 on the power lever, as shown in FIG. 9. The arm 210 of the pawl 182 is formed with a tooth or point 212 which is adapted to move in front of the ear 168 when the power lever 72 is moved clockwise by its return spring 164. Thus, when the power lever 72 is returned to its initial position, the spring 204 causes the pawl 182 to swing through an additional angle in a counterclockwise direction until the tooth 212 is in the path of the ear 168.

Figure 10:
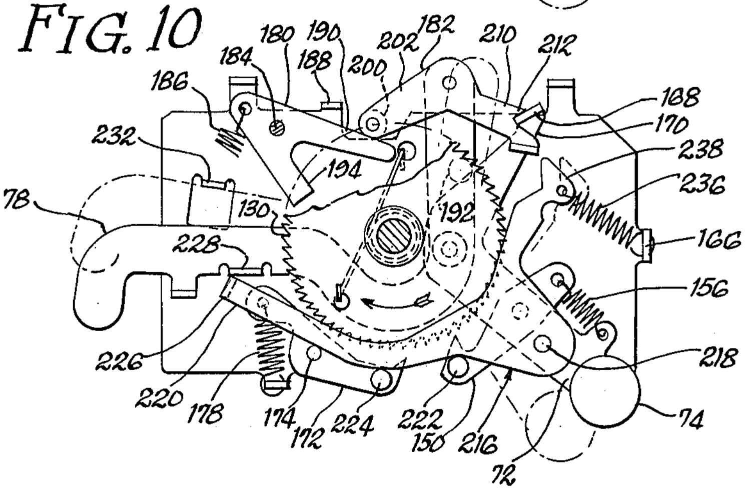
FIG. 10 is a view similar to FIG. 3 but showing the changed positions of various parts when the counter is actuated to register the last count in the sequence.

When the last count is registered, as shown in FIG. 10, the ear 168 pushes on the tooth 212 of the pawl 182, which thereby forms a solid operating connection between the power lever 72 and the output lever 78. The output lever 78 is swung in a counterclockwise direction along with the power lever 72.

Means are provided for releasing the pawls 150 and 172 from the ratchet wheel 130 in response to the downward movement of the output lever 78. In this way, the ratchet wheel is released for return movement under the impetus of the return spring 140. The ratchet wheel is returned to a position in which the ear 134 on the ratchet wheel is against the ear 128 on the disc 110. As shown to advantage in FIG. 10, the output lever 78 is adapted to operate the releasing lever 216 which is swingable about a pivot 218 on the front plate 98. The lever 216 has a long curved arm 220 which is engageable with pins 222 and 224 on the pawls 150 and 172. The left-hand end of the arm 220 is formed with an ear 226 which is adapted to be engaged by a flange or ear 228 on the output lever 78. Thus, when the output lever 78 is swung downwardly, the arm 220 is also swung downwardly so as to move the pawls 150 and 172 downwardly out of engagement with the ratchet wheel 130. The ratchet wheel 130 is immediately returned to its starting position. The horizontal arm 190 of the relay lever 180 is offset rearwardly and thus is out of the path of the pin 192 as the ratchet wheel 130 is returned by the spring 140.

When the power lever 72 is returned in a clockwise direction after registering the last count, the output lever 78 is also returned by its return spring 230 which is connected between an ear 232 on the rear plate 100 and an ear 234 on the lever 78. The lever 78 is arrested in its return movement by engagement with the ear 232. Thereafter, the pawl 182 is disengaged from the ear 168 on the power lever 72 by the action of the intermediate lever 180 which swings the pawl in a clockwise direction. The return spring 186 for the intermediate lever 180 has a greater effective strength than the spring 204 for the pawl 182 so that the force of the spring 186 overcomes the force of the spring 204.

When the output lever 78 is returned upwardly, the releasing lever 216 is returned in a clockwise direction by its return spring 236 which is connected between the fixed ear 166 and an arm 238 of the lever 216. Thus, pawls 150 and 172 are permitted to return into engagement with the ratchet wheel 130, so that the counter is ready for another counting sequence.

Figure 11:
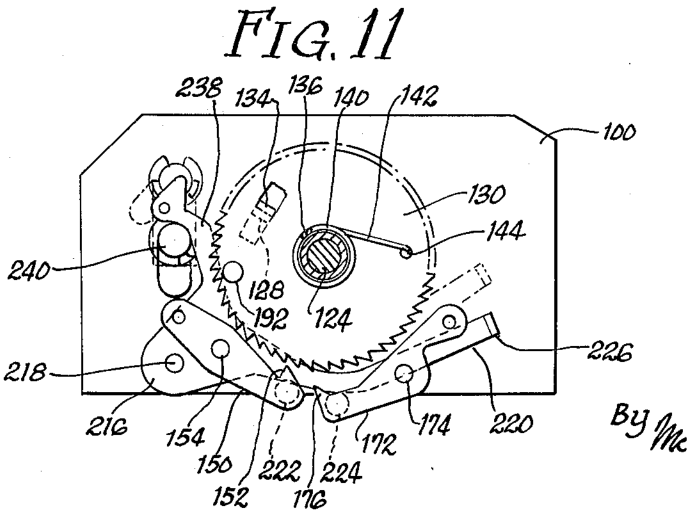
FIG. 11 is a sectional view taken along approximately the same plane as FIG. 7 but showing the manner in which the counter is shut off by the manual operation of a control slide.

It has already been indicated that the counter may be disabled by moving the resetting knob 94 upwardly, so as to translate the resetting slide 96 to its uppermost position. Such movement of the slide 96 is effective to swing the releasing lever 216 in a counterclockwise direction, so that the pawls 150 and 172 are disengaged from the ratchet wheel 130. The releasing lever 216 is operated by a pin 240 which projects rearwardly from the slide 96 through a slot 242 in the front plate 98. The pin 240 engages the arm 238 of the releasing lever 216 and causes the arm 238 to be displaced to the left. At the upper limit of its travel, the pin 240 enters a detent notch 244 in the arm 238, so that the pin is detained in this position until the knob 94 is pushed downwardly. The releasing action of the pin 240 is shown to good advantage in FIG. 11.

It may be helpful to summarize the operation of the counter 20. The duplicating machine 22 is started by swinging the hand lever 28 clockwise. This swings the lever 38 clockwise and causes the cam 44 to rotate counterclockwise. The lever 28 is detained by the engagement of the roller 36 by the detent notch 42.

The cam 44 oscillates the lever 50 which in turn oscillates the lever 56. In this way, the power lever 72 is swung counterclockwise and is permitted to return clockwise for each sheet of paper which is fed through the machine 22.

The pawl 150 on the power lever 72 advances the ratchet wheel 130 step by step. The pawl 172 prevents retrograde movement of the ratchet wheel 130. When the next to the last count is registered, the pin 192 on the ratchet wheel 130 engages the arm 194 and swings the lever 180 clockwise, to the position shown in FIG. 9. When the power lever 72 is returned clockwise, the tooth 212 on the pawl 182 engages the ear 168 on the power lever 72. Upon the next counterclockwise swing of the power lever 72, the pawl 182 causes the output lever 78 to swing counterclockwise along with the power lever 72. The output lever 78 engages the ear 26 on the releasing lever 216 and swings it counterclockwise so as to disengage the pawls 150 and 172 from the ratchet wheel 130. As a result, the ratchet wheel is immediately returned to its initial position in which the ear 134 on the wheel 130 engages the ear 128 on the preselecting disc 110.

The counterclockwise movement of the output lever 78 operates the lever 80 which in turn swings the main control lever 28 in a counterclockwise direction so as to shut off the feed. Accordingly, the cam 44 is stopped so that no further count is registered on the counter.

The setting of the counter 20 may be changed by raising the resetting knob 94, pressing rearwardly on the selector knob 92, and rotating the knob 92 until the desired count on the dial 106 is opposite the pointer 108. The knob 92 is then allowed to move forward, whereupon it is locked by the engagement of the toothed disc 110 with the detent 112. When the knob 94 is raised, the pin 240 swings the releasing lever 216 in a counterclockwise direction (FIG. 3) so as to disengage the pawls 150 and 172 from the ratchet wheel 130.

When the counter has been preset, it will count to the preset number through successive counting sequences, without any need to reset the counter. This mode of operation is especially convenient when it is desired to run the same number of copies from each of a series of different masters. Of course, it is very easy to reset the counter when it is necessary to change the number of copies. The counter shuts off the machine automatically so that it is not necessary for the operator to give any attention to the counter while the machine is operating.

Various other modifications, alternative constructions and equivalents may be employed without departing from the true spirit and scope of the invention, as exemplified in the foregoing description and defined in the following claims.

We claim:

1. In a counter for duplicating machines or the like, the combination comprising a rotatable ratchet wheel,
a rotatable preselector knob,
an adjustable stop rotatable with said knob,
means for releasibly locking said knob in any of a series of positions,
a member on said ratchet wheel and engageable with said stop to establish the initial position of said wheel,
a return spring biasing said wheel in a direction to move said member against said stop,
a swingable power lever,
an operating pawl connected to said lever for advancing said ratchet wheel,
a non-retrograde pawl engaging said ratchet wheel to prevent reverse rotation thereof,
a swingable output lever,
a connecting pawl swingably mounted on said output lever,
an element on said power lever for engaging said connecting pawl,
an intermediate lever normally holding said connecting pawl out of the path of said element,
a projection on said ratchet wheel and engageable with said intermediate lever for causing said connecting pawl to move into the path of said element,
said connecting pawl thereby being effective to move said output lever with said power lever,
a swingable releasing lever operable by said output lever and engageable with said operating pawl and said non-retrograde pawl to disengage said operating and non-retrograde pawls from said ratchet wheel whereby said ratcht wheel is freed for return movement by said spring,
and a manually movable control member for swinging said releasing lever to disengage said operating and non-retrograde pawls from said ratchet wheel.

2. In a counter for duplicating machines or the like, the combination comprising a movable ratchet member,
a movable input member,
an operating pawl connected to said input member and engageable with said ratchet member for advancing said ratchet member,
a non-retrograde pawl engageable with said ratchet member for preventing reverse movement thereof,
manually adjustable stop means establishing an initial position of said ratchet member,
biasing means connnected to said ratchet member and urging said ratchet member in a reverse direction,
a movable output member,
a connecting link movably mounted on said output member,
an element on said input member for engaging said link,
a movable intermediate normally holding said link out of the path of said element,
a formation on said ratchet member and engageable with said intermediate member for causing movement of said link into the path of said element whereby said link causes said output member to move with said input member,
and a movable releasing member operable by said output member and effective to disengage said pawls from said ratchet member to free said ratchet member for return movement by said biasing means.

3. In a counter for printing machines or the like, the combination comprising a movable ratchet member,
manually adjustable means for establishing the initial position of said ratchet member,
a movable input member,
an operating pawl connected to said input member for advancing said ratchet member in response to oscillation thereof,
a non-retrograde pawl for preventing return movement of said ratchet member,
biasing means connected to said ratchet member and tending to cause such return movement thereof,
a movable output member,
a connecting member movable between said input and output members,
intermediate means normally holding said connecting member out of connecting relation between said input and output members,
means movable with said ratchet member and effective upon movement thereof to a predetermined position for operating said intermediate means to cause movement of said connecting member into connecting relation between said input and output members whereby said output member is moved by said input member on the next oscillation thereof,
and means operable by movement of said output member for disengaging said pawls from said ratchet member to free said ratchet member for return movement by said biasing means.

4. In a counter for duplicating machines or the like, the combination comprising a movable ratchet member,
a movable input member,
an operating pawl connected to said input member and engageable with said ratchet member for advancing said ratchet member,
a non-retrograde pawl engageable with said ratchet member for preventing reverse movement thereof,
manually adjustable stop means establishing an initial position of said ratchet member,
biasing means connected to said ratchet member and urging said ratchet member in a reverse direction,
a movable output member,
a connecting link movably mounted on said output member,
an element on said input member for engaging said link,
a movable intermediate member normally holding said link out of the path of said element,
a formation on said ratchet member and engageable with said intermediate member for causing movement of said link into the path of said element whereby said link causes said output member to move with said input member,
a movable releasing member operable by said output member and effective to disengage said pawls from said ratchet member to free said ratchet member for return movement by said biasing means,
and means for manually operating said releasing member.

5. In a counter for printing machines or the like, the combination comprising a movable ratchet member, manually adjustable means for establishing the initial position of said ratchet member,
a movable input member,
an operating pawl connected to said input member for advancing said ratchet member in response to oscillation thereof,
a non-retrograde pawl for preventing return movement of said ratchet member,
biasing means connected to said ratchet member and tending to cause such return movement thereof,
a movable output member,
a connecting member movable between said input and output members,
intermediate means normally holding said connecting member out of connecting relation between said input and output members,
means movable with said ratchet member and effective upon movement thereof to a predetermined position for operating said intermediate means to cause movement of said connecting member into connecting relation between said input and output members whereby said output member is moved by said input member on the next oscillation thereof,
means operable by movement of said output member for disengaging said pawls from said ratchet member to free said ratchet member for return movement by said biasing means,
and means for manually disengaging said pawls from said ratchet member.

6. In a counter for printing machines or the like,
the combination comprising a movable ratchet member,
manually adjustable means for establishing the initial position of said ratchet member, a movable input member,
an operating pawl connected to said input member for advancing said ratchet member in response to oscillation of said input member,
a non-retrograde pawl for preventing return movement of said ratchet member,
biasing means connected to said ratchet member and tending to cause such return movement thereof,
a movable output member,
a connecting member movable between said input and output members,
means normally holding said connecting member out connecting relation between said input and output members,
means operable by said ratchet member and effective upon movement thereof to a predetermined position for causing movement of said connecting member into connecting relation between said input and output members whereby said output member is moved by said input member on the next oscillation thereof,
and means operable by movement of said output member for disengaging said pawls from said ratchet member to free said ratchet member for return movement of said biasing means.

References Cited by the Examiner

UNITED STATES PATENTS

| | | | |
|---|---|---|---|
| 1,908,626 | 5/1933 | Ford | 235—132 X |
| 2,034,102 | 3/1936 | Lasker | 235—132 X |
| 2,298,558 | 10/1942 | Ferry | 235—132 X |

LEO SMILOW, *Primary Examiner.*